R. E. HELLMUND.
WINDING FOR DYNAMO ELECTRIC MACHINES.
APPLICATION FILED AUG. 10, 1918.
1,376,433.
Patented May 3, 1921.
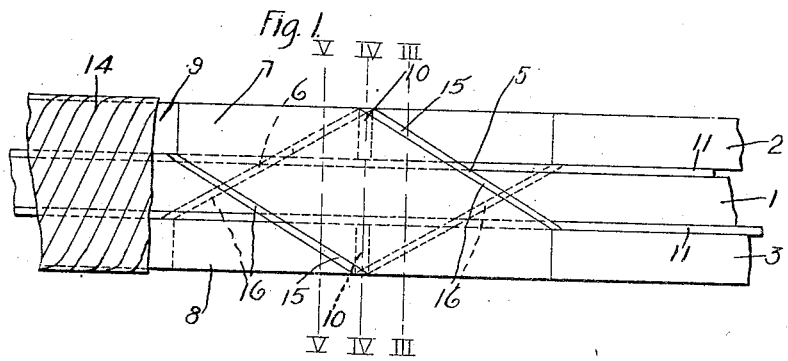
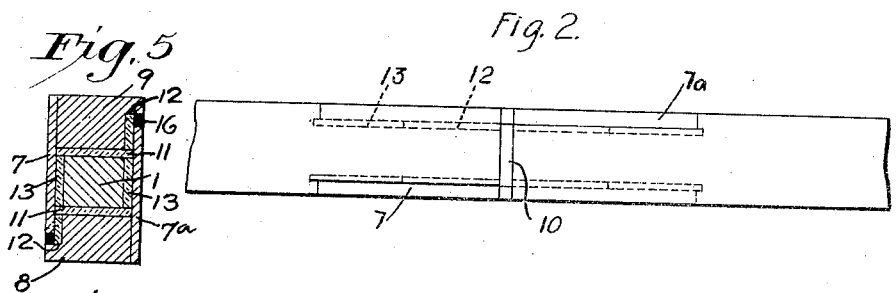
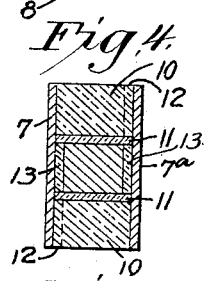
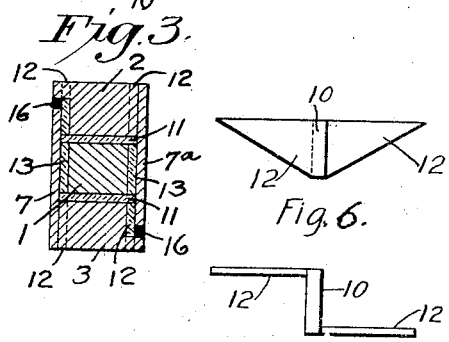
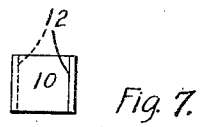
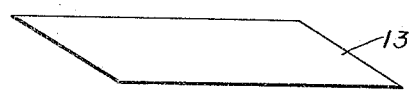
WITNESSES:
H. B. Funk.
F. A. Lind.
INVENTOR
Rudolf E. Hellmund.
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

WINDING FOR DYNAMO-ELECTRIC MACHINES.

1,376,433.   Specification of Letters Patent.   Patented May 3, 1921.

Application filed August 10, 1918. Serial No. 249,334.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Windings for Dynamo-Electric Machines, of which the following is a specification.

My invention relates to dynamo-electric machines and particularly to windings employed on alternating-current motors of the closed-slot type wherein a minimum of eddy currents is desirable.

It is a well known fact that eddy currents in conductors result from differences of potential in various parts of the conductor produced by unequal distribution of the field within the conductor-containing slot. In order to reduce the eddy currents to a minimum, the conductors are frequently laminated, the separate portions of a conductor being usually maintained in proper relation by nesting them together somewhat in the form a helix. The assembled portions of the conductor are then placed in the slot as a unit. A subdivided conductor of the type just mentioned is easily placed in position in a dynamo-electric machine member having open slots, but, when partially open or closed slots are employed, into which the conductors must be driven from one end, such as are frequently employed in single-phase commutator motors, it becomes a very difficult task to insert a conductor of this nature in the slot.

By my present invention, the above-mentioned difficulty is overcome and a perfectly symmetrical conductor of relatively great strength is produced.

Referring to the accompanying drawings, Figure 1 is a side elevational view, with parts broken away for the sake of clearness, of a portion of a subdivided conductor constructed in accordance with my invention; Fig. 2 is a plan view of the conductor shown in Fig. 1; Figs. 3, 4 and 5 are transverse sectional views illustrating a plurality of conductors of the kind shown in Fig. 1 disposed within closed slots in an armature core the sections being taken along the lines III—III, IV—IV and V—V, respectively, of Fig. 1; and Figs. 6 to 9, inclusive, are detail views of various elements of my invention.

Referring more particularly to the drawings, I show a subdivided conductor comprising a centrally disposed straight portion 1 which extends the entire length of the slot and additional conductor portions 2, 3, 8 and 9 which extend only half the length of the slots. Each of the conductor portions 1, 2, 3, 8 and 9 is of substantially the width of the slot within which it is disposed. The conductor portion 3, which is disposed in the bottom of the slot at one end, is connected to the conductor portion 9, which is disposed in the top portion of the slot at its other end, by means of a conducting plate 7 which extends through a parallelogram-shape recess 5 in one side of the conductor 1 and through triangular recesses 15 at the inner ends of the conductors 2 and 8. The plate 7 is insulated from the conductor 1 by means of a parallelogram-shape insulating plate 13, as best shown in Fig. 9, that is disposed within the recess 5, and from the conductors 2 and 8 by means of triangular projections 12 of insulating spacing members 10, as best shown in Figs. 6, 7 and 8, disposed within the recesses 15. The edges of the plate 7 are insulated from the edges of the recesses 5 and 15 in the conductors 1, 2 and 8, respectively, by means of narrow strips of insulating material 16. The plates 2 and 8 are connected by means of a conducting plate 7ª insulated from the conductors 1, 3 and 9, in a manner similar to that described in connection with plate 7. The straight portion 1 is insulated from the portions 2, 3, 8 and 9 by means of interposed strips 11 of insulating material.

The conductors 2 and 3 are insulated from conductors 9 and 8, respectively, by means of the spacing members 10 of which there are two in each slot, one on each side of the conductor 1. The spacing members 10 are each provided with two projections 12 at their ends that extend in directions perpendicular to the main body portion 10 and in opposite directions to each other. One of the projections of the spacing member at the top of the conductor serves to insulate the plate 7 from the conductor 2, the other projection thereof serving to insulate the plate 7ª from the conductor 9. Likewise, one of the flanges 12 of the member 10 at the bottom of the slot separates the plate 7 from the conductor 8, and the other flange separates the plate 7ª from the conductor 3. After the conductor has been assembled, it is wrapped with a layer of insulating material 14 whereby it is insulated from the walls of the slot.

On account of the portion 1 being straight and continuous throughout the length of the slot and by reason of the alinement of the portions 2 and 3 with the portions 9 and 8, respectively, a conductor of very great compressive strength is produced, which is desirable in a conductor which must be driven into a slot. It will be obvious that the straight portion will take most of the strain when the conductor is driven in and also that, by reason of the alined relation of the side portions, they too will stand considerable compressive stress.

Although it is preferable to have a straight conductor extend throughout the length of the slot, such arrangement is not essential. If the conductor should consist of two parts only, it would evidently be impossible to have one of the conductors straight and, at the same time, have them in transposed positions in different portions of the slot. With this construction, it is preferable to have neither conductor straight, both being arranged for transposition at the middle of the slot, in a manner similar to that already described.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. A subdivided electrical conductor comprising a straight portion and other portions disposed in abutting relation with each other and having cross-over connections with each other.

2. In a dynamo-electric machine, a magnetizable core member provided with a plurality of slots, and subdivided electrical conductors located in said slots, each comprising a relatively long straight unitary portion and shorter straight portions which are disposed in abutting relation and are cross-connected within the slot.

3. In a dynamo-electric machine, a magnetizable core member provided with a plurality of slots, and subdivided electrical conductors located in said slots, each comprising a centrally disposed straight portion, and top and bottom portions that cross said straight portion within the slot.

4. In a dynamo-electric machine, a magnetizable core member provided with a plurality of slots, subdivided electrical conductors located in said slots each comprising a centrally disposed straight portion provided with side recesses and a plurality of additional portions two of which fit into said recesses to provide cross-over connections for the other additional portions.

5. In a dynamo-electric machine, a magnetizable core member provided with a plurality of slots, and subdivided conductors located in said slots, each comprising a centrally disposed straight portion provided with side recesses, top and bottom portions disposed within said slot, and cross-over portions disposed in said recesses, said centrally disposed and top and bottom portions being of equal width with said slot.

6. In a dynamo-electric machine, a magnetizable core member provided with a plurality of slots, and subdivided conductors located in said slots, each comprising a straight portion and two sets of additional portions disposed in said slot in top and bottom relation with said straight portion, said sets being disposed in abutting but insulated relation and being cross-connected within the slot.

7. In a dynamo-electric machine, a magnetizable core member provided with a plurality of slots, and subdivided conductors located in said slots, each comprising two sets of straight portions disposed within each slot in abutting relation and having the various portions thereof cross-connected at the point where they abut each other, said conductors being insulated from each other and from said cross connections by means of insulating members of unitary structure having a central portion and integral end portions arranged in parallel planes and extending in opposite directions from said central portion.

In testimony whereof I have hereunto subscribed my name this 31st day of July, 1918.

RUDOLF E. HELLMUND.